US 6,668,979 B2

(12) United States Patent
McQuaid et al.

(10) Patent No.: US 6,668,979 B2
(45) Date of Patent: Dec. 30, 2003

(54) EXTENSION/RETRACTION MECHANISM FOR CHECKSTAND WITH TELESCOPING TAKE-AWAY CONVEYOR

(75) Inventors: James M. McQuaid, Seattle, WA (US); Harry B. Todd, Port Orchard, WA (US); Charles W. Lindstrom, Lynnwood, WA (US)

(73) Assignee: Selkirk Industries, LLC, Lynnwood, WA (US)

(*) Notice: Subject to any disclaimer, the term of this patent is extended or adjusted under 35 U.S.C. 154(b) by 110 days.

(21) Appl. No.: 10/023,589

(22) Filed: Dec. 17, 2001

(65) Prior Publication Data

US 2003/0111296 A1 Jun. 19, 2003

(51) Int. Cl.$^7$ .......................... B65G 15/00; B65G 41/00
(52) U.S. Cl. ........................... 186/68; 186/69; 198/594; 198/812
(58) Field of Search ............................... 186/68, 52, 58, 186/59, 60, 69; 198/586, 594, 812, 861.1

(56) References Cited

U.S. PATENT DOCUMENTS

| | | | | |
|---|---|---|---|---|
| 3,066,760 A | * | 12/1962 | Brigham et al. | 186/59 |
| 3,127,978 A | | 4/1964 | Zuercher | |
| 3,656,587 A | | 4/1972 | Siegel | |
| 3,826,353 A | | 7/1974 | Greasley | |
| 3,935,941 A | | 2/1976 | Keck | |
| 4,061,205 A | | 12/1977 | Musser | |
| 4,182,433 A | | 1/1980 | Foster | |
| 4,265,336 A | | 5/1981 | Foster | |
| 4,392,553 A | | 7/1983 | Foster | |
| 4,512,540 A | | 4/1985 | Stroh | |
| 5,046,603 A | * | 9/1991 | Odenthal | 198/812 |
| 5,074,402 A | | 12/1991 | Bender-Zanoni et al. | |
| 5,277,297 A | * | 1/1994 | Tolson | 198/626.5 |
| 5,423,413 A | | 6/1995 | Gilmore | |
| 5,755,308 A | * | 5/1998 | Lindstrom et al. | 186/66 |
| 5,796,052 A | * | 8/1998 | Christmann | 177/145 |
| 6,035,971 A | * | 3/2000 | Lindstrom et al. | 186/61 |

OTHER PUBLICATIONS

The Reynolds Corporation: "The Data 4000 Dual Power Take Away System" (Information Sheet); May 1, 1985.
The Reynolds Corporation: "The Data 3000 CD3RT2 Series Left Hand Take Away" (Information Sheet); Apr. 1, 1987.
The Reynolds Corporation: "The Data 3000 Series Left Hand Take Away with Slide Back Belt" CD3RT5 (Information Sheet); May 18, 1988.

* cited by examiner

Primary Examiner—Donald P. Walsh
Assistant Examiner—Mark J. Beauchaine
(74) Attorney, Agent, or Firm—Leydig, Voit & Mayer, Ltd.

(57) ABSTRACT

An extension/retraction mechanism for a take-away conveyor in a checkstand. The extension/retraction mechanism selectively stops and holds the telescoping take-away conveyor at the scan-and-bag position as the telescoping take-away conveyor is moving between walk-through and scan-and-pass positions. The extension/retraction mechanism includes a cam follower that is pivotally attached to the telescoping take-away conveyor for movement therewith. The cam follower rides within a cam track as the telescoping conveyor moves between the scan-and-bag, walk-through, and scan-and-pass positions. The cam track includes a series of turn surfaces so that the cam follower changes course as the telescoping take-away conveyor moves backward and forward. The cam track also includes at least one pocket for retaining the cam follower when the telescoping take-away conveyor is in the scan-and-bag position.

24 Claims, 8 Drawing Sheets

EXTENSION/RETRACTION MECHANISM FOR CHECKSTAND WITH TELESCOPING TAKE-AWAY CONVEYOR

FIELD OF THE INVENTION

The present invention relates to checkstands, and, more specifically, to store checkstands.

BACKGROUND OF THE INVENTION

A checkstand is a station at which a customer or clerk unloads the items the customer intends to purchase, e.g., groceries, a register clerk scans or enters the prices of the items, the customer pays for the items, the items are bagged, and the bagged groceries are placed in a cart or handed to the customer. In some stores, a separate clerk bags the items and places the bags into a cart. A number of checkstands are usually lined along the exit of a store so that multiple customers can purchase items at the same time on the way out of the store.

One design of a checkstand includes a front module upon which the customer unloads groceries or other items. A scanner and register are located at the trailing end of the front module. The front module usually includes a conveyor, called an "accumulation conveyor," for conveying the groceries toward the scanner and the cash register. A register clerk lifts each of the items from the accumulation conveyor and either scans the item across the scanner, or manually enters the price and stock number information in the cash register. The scanned items are placed on a second conveyor, called a "take-away conveyor," that extends to a rear module. The take-away conveyor deposits the scanned items at the trailing end of the rear module, where a bagging clerk places each of the scanned items into bags.

In normal operation of a checkstand, such as is described above, the leading edge of the take-away conveyor extends from the trailing edge of the scanner to the rear of the rear module, such that a constant surface is formed between the accumulation conveyor, the scanner, and the take-away conveyor. This arrangement is convenient for the register clerk, allowing him or her to quickly scan-and-pass a large amount of items. For ease of description, the configuration and operation in which the take-away conveyor extends from the trailing edge of the scanner will be called "scan-and-pass."

A large number of grocery stores are reducing their work force by eliminating the need for a separate bagging clerk during slower periods of business or at checkstands where a limited number of items are purchased. When a separate bagging clerk is not used, the register clerk both scans and bags the groceries. For maximal efficiency, it is desirable for the register clerk to bag the groceries as they are scanned. To provide this service, some prior art checkstands include a take-away conveyor having a leading end which is movable away from the trailing end of the scanner. Withdrawal of the take-away conveyor exposes an area located beneath the leading end of the conveyor. The exposed area includes a support shelf for use in bagging groceries and other items. If the take-away conveyor is partially withdrawn, a single bag can be inserted between the leading end of the take-away conveyor and the trailing end of the scanner. This single bag may be located, for example, on a bag stand. In this arrangement of the checkstand, the register clerk may scan an item and reach over the bag stand and place the item on the take-away conveyor, or may place the scanned item in a bag on the bag stand. For ease of description, the configuration and operation in which the take-away conveyor is in this intermediate position will be called "scan-and-bag."

For some prior art checkstands, the take-away conveyor is designed to be further retracted (i.e., away from the bag stand) to provide access to a pass-through, adjacent to the bag stand, via which the register clerk may access the customer's cart to load bags that have been filled at the bag stand. For ease of description, the configuration and operation in which the take-away conveyor is retracted so that the register clerk may pass will be called "walk-through."

The prior art provides at least three ways of withdrawing the take-away conveyor from the trailing edge of the scanner. In a first checkstand design, the take-away conveyor is of fixed length, and is mounted so it can slide into a recess in the rear module. The register clerk pulls the take-away conveyor forward to the scanner to perform scan-and-pass operation, and pushes the take-away conveyor backward into the recess to perform the scan-and-bag or the walk-through operations.

There are a number of problems with a manually-operated retractable, take-away conveyor. First, the manually-operated retractable conveyor is often heavy and difficult to move in or out of the rear module. Thus, the register clerk may not take advantage of the reconfigurable aspects of the checkstand. In addition, in the scan-and-pass position, the trailing end of the take-away conveyor is removed from the trailing end of the rear module, leaving a large portion of the rear module recess exposed. Typically, a cover plate extends over a portion of the recess to minimize the exposed area. Items moving along the take-away conveyor when it is in the scan-and-pass position are deposited onto the leading edge of the cover plate. This leading edge is removed from the back end of the rear module by a length that is at least as long as the slide of the take-away conveyor. To reach the groceries or other items conveyed by the take-away conveyor, a bagging clerk must extend out over the cover plate. Constant reaching and extension by the bagging clerk is inconvenient, and may be uncomfortable for the bagging clerk. Another downside of the manually-operated retractable take-away conveyors is that the conveyor recess, and therefore the conveyor length, is limited by the length of the rear module recess.

Another checkstand design utilizes a fold down take-away conveyor that extends between the rear module and the scanner. An example of such a checkstand is shown in U.S. Pat. No. 4,182,433 to Foster. In scan-and-pass operation, the fold down conveyor extends horizontally from the trailing edge of the scanner to the leading edge of the rear module. A second take-away conveyor extends along the top surface of the rear module and abuts the trailing edge of the fold down conveyor. After being scanned, items are placed on the fold down conveyor, and are conveyed along the fold down conveyor to the second take-away conveyor. The groceries then move along the second take-away conveyor toward the trailing end of the rear module. If the register clerk wishes to perform a scan-and-bag or walk-through operation, the leading end (closest to the scanner) of the fold down conveyor is released, and the conveyor is rotated downward about the trailing end (closest to the rear module) of the conveyor so that the fold down conveyor extends perpendicularly to the floor. A single bag is then inserted adjacent to the trailing end of the scanner, and the register clerk is provided a station which permits convenient scanning and bagging of groceries. When the single bag is removed from the second take-away conveyor, a walk-through space is provided. Because the fold down conveyor has only two configurations, the scan-and-bag configuration described above cannot be easily provided. In addition, manipulation of the fold down conveyor and bagging stand are difficult and time consuming. This hindrance may cause a register clerk not to use the different configurations provided by the checkstand.

The assignee of the present invention solved the above-described problems by developing a checkstand having a telescoping take-away conveyor. The telescoping take-away conveyor is the subject of the commonly assigned U.S. Pat. Nos. 5,755,308 and 6,035,971. Each of these patents is directed to a checkstand having a telescoping take-away conveyor that is reconfigurable between the scan-and-pass, walk-through, and scan-and-bag positions described above. The telescoping take-away conveyor in one embodiment provides automatic retraction and extension of the telescoping take-away conveyor between the scan-and-pass, scan-and-bag, and walk-through positions. A friction roller in the telescoping take-away conveyor causes the telescoping take-away conveyor to have a tendency to either retract or expand, depending upon the direction of rotation of the conveyor belt for the telescoping take-away conveyor.

The telescoping take-away conveyor offers many advantages over prior art checkstands. For the telescoping take-away conveyor that automatically retracts and extends, a register clerk does not have to manually lift or slide the telescoping take-away conveyor, nor leave his or her post to reconfigure the checkstand. In addition, the telescoping take-away conveyor expands, or lengthens, to extend to the front module (i.e., in scan-and-pass mode), yet maintains a back end of the conveying surface at the back of the rear module. In this manner, items placed on the telescoping take-away conveyor while the telescoping take-away conveyor is in the scan-and-pass configuration are deposited on the rear portion of the rear module, instead of an intermediate position.

Although the telescoping take-away conveyor works well for its intended purpose, the specific operation described in the above patents for switching between the scan-and-pass, walk-through, and scan-and-bag positions involves using two buttons at correct times. The first button determines the rotation direction of the telescoping take-away conveyor, which in turn determines whether the telescoping take-away conveyor attempts to expand or retract. The second button operates a solenoid that causes a mechanical stop to move back and forth so that, in a first position of the mechanical stop, the telescoping take-away conveyor stops retraction from the scan-and-bag position at the walk-through position, and at a second position of the mechanical stop, the telescoping take-away conveyor retracts past the scan-and-bag position to the walk-through position. While this operation is basically simple, it still requires some training to learn the operation of the two buttons, and may be difficult for some clerks to grasp. Moreover, the use of the solenoid in the extension/retraction mechanism adds expense to the manufacture of the checkstand.

SUMMARY OF THE INVENTION

The present invention is directed to an improved extension/retraction mechanism for a telescoping conveyor used, for example, as a take-away conveyor in a checkstand. The extension/retraction mechanism is a mechanism that is configured to selectively stop and hold the telescoping take-away conveyor at the scan-and-bag position as the telescoping take-away conveyor is moving between the walk-through and scan-and-pass positions.

In accordance with one aspect of the present invention, the extension/retraction mechanism includes a cam follower that moves along with the telescoping take-away conveyor and that is pivotally attached to the telescoping take-away conveyor. The cam follower rides within a cam track as the telescoping conveyor moves between the scan-and-bag, walk-through, and scan-and-pass positions. The cam track includes a series of turn surfaces so that the cam follower may change course (e.g., along a different pathway or direction within the cam track) as the telescoping take-away conveyor moves along the cam track. The cam track also includes at least one pocket for retaining the cam follower when the telescoping take-away conveyor is in the scan-and-bag position.

The cam track preferably includes a first pathway along which the cam follower travels as the telescoping take-away conveyor is advanced forward from the walk-through position. A first turn surface is located at a forward end of the first pathway, and is engaged just prior to the telescoping take-away conveyor reaching a location adjacent to the scan-and-bag position. The turn surface causes the cam follower to turn off the first pathway.

If the telescoping take-away conveyor is to stop at the intermediate, scan-and-bag position, the telescoping take-away conveyor is stopped while it advances along the first turn surface (e.g., by contacting a bag stand that is inserted behind the scanner). The telescoping take-away conveyor is then retracted. The movement of the cam follower along the first turn surface causes the cam follower to no longer be aligned with the first pathway. A pocket is located rearward of the first turn surface, and receives the cam follower as the telescoping take-away conveyor is retracted. The engagement of the cam follower with the pocket prevents further retraction. Thus, the telescoping take-away conveyor is held in the scan-and-bag position.

To remove the telescoping take-away conveyor from the scan-and-bag position, the telescoping take-away conveyor is extended, causing the cam follower to be removed from the pocket. The cam follower then engages a second turn surface, which directs the cam follower to a second pathway. The telescoping take-away conveyor may then move forward along the second pathway to the scan-and-pass position, or may be returned along the second pathway to the walk-through position. Upon returning to the walk-through position, the second pathway preferably returns the cam follower to the first pathway, e.g., along a curved turn surface. Thus, upon advancing the telescoping take-away conveyor again, the cam follower travels along the first pathway again.

The first turn surface, the first pathway, and the second pathway are preferably arranged such that, when the cam follower runs along the first turn surface, and the telescoping take-away conveyor extends beyond the scan-and-bag position, the cam follower is fed by the first turn surface into the second pathway. The cam follower may continue up the second pathway until the telescoping take-away conveyor reaches the scan-and-pass position. To return to the walk-through position, the telescoping take-away conveyor may be retracted, whereby the cam follower returns to the first pathway via the second pathway.

The extension/retraction mechanism of the present invention provides a means by which the telescoping take-away conveyor may alternatively stop at the scan-and-bag or scan-and-pass locations without requiring a solenoid or other complicated or expensive parts. The extension/retraction mechanism further provides a mechanism whereby a telescoping take-away conveyor may be retracted and extended between the walk-through, scan-and-pass, and scan-and-bag positions by using a two switches or buttons. For example, the telescoping take-away conveyor may include a friction roller or other friction device whereby changing the direction of rotation of the conveyor belt for the telescoping take-away conveyor causes the telescoping take-away conveyor to have a tendency to either retract or expand. Using such a device, a clerk may move the telescoping take-away conveyor between the walk-through, scan-and-pass, and scan-and-bag positions by simply reversing the direction of rotation of the telescoping take-away conveyor.

Other advantages will become apparent from the following detailed description when taken in conjunction with the drawings, in which:

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well-known features may be omitted or simplified in order not to obscure the present invention. In addition, to the extent that orientations of the invention are described, such as "top," "bottom," "front," "back," and the like, the orientations are to aid the reader in understanding the invention, and are not meant to be limiting.

Figure 1:
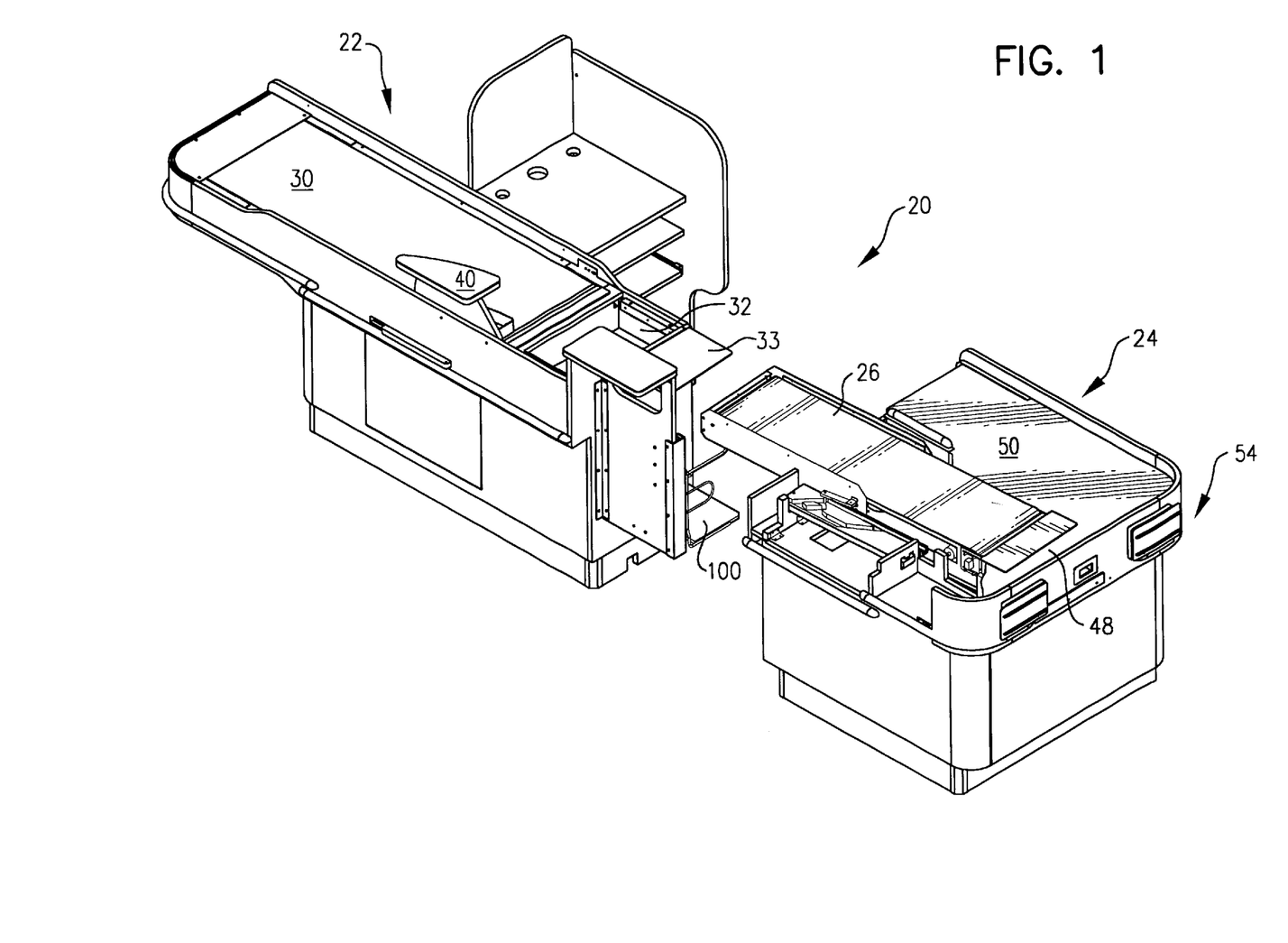
FIG. 1 is a perspective view of a checkstand incorporating the present invention, with a partial cutaway of a rear module of the checkstand to show a extension/retraction mechanism for the checkstand.

Referring now to the drawings, in which like numerals represent like parts throughout the several views, FIG. 1 shows a checkstand 20 incorporating the present invention. The checkstand 20 includes a front module 22 and a rear module 24. A telescoping take-away conveyor 26 is extendable from the front module 22 to the rear module 24, and is shown in FIG. 1 as being about half way between fully extended and fully retracted positions. The telescoping take-away conveyor 26 may be extendible manually, or, as described further below, may include a mechanism or structure that permits it to be extendible automatically.

Figure 2:
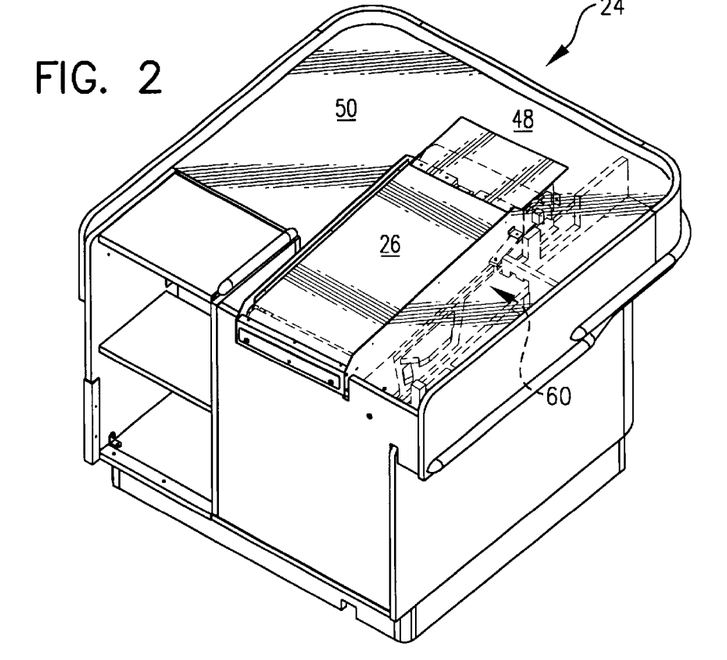
FIG. 2 is a front perspective view of rear module of the checkstand of FIG. 1.

Briefly described, the checkstand 20 is arranged so that a customer places groceries or other items on the front module 22 and the items are conveyed to the register clerk for scanning. When the telescoping take-away conveyor 26 is fully extended to the front module 22, the scanned items are placed on the telescoping take-away conveyor 26. The telescoping take-away conveyor 26 deposits the scanned items at the trailing end of the rear module 24, where a bagging clerk places each of the scanned items into bags. The checkstand 20 thus may offer scan-and-pass operation. The telescoping take-away conveyor 26 may also be retracted from the scan-and-pass position to the position shown in FIG. 2. In this position, the checkstand allows walk-through operation.

For ease of description, the left side of FIG. 1 is referred to as the "leading," or front, end of the checkstand 20, and the right side of FIG. 1 is referred to as the "trailing," or rear, end of the checkstand. The side of the checkstand 20 opposite the viewer in FIG. 1 is referred to as the "register clerk" side, and the side on the same side as the viewer is the "customer" side of the checkstand 20.

The front module 22 includes an accumulation conveyor 30. A scanner 32 is located at the trailing end of the accumulation conveyor 30. A transition plate 33 is hinged from the top, trailing edge of the scanner 32 and extends rearward from the scanner (the transition plate is shown folded outward in FIG. 1). The transition plate 33 extends to the leading edge of the telescoping take-away conveyor 26 when the telescoping take-away conveyor is in the scan-and-pass position. Along the register clerk side of the accumulation conveyor 30, adjacent to the scanner 32, may be located such items as a cash drawer and a register (not shown, but known in the art). These items are arranged so that they can be easily accessed by a register clerk located in the register clerk side of the checkstand 20.

On the customer side of the accumulation conveyor 30, adjacent to the scanner 32, is a check writing surface 40. The check writing surface 40 is arranged so that it may be easily accessed by a customer standing in a customer waiting area adjacent to the accumulation conveyor 30.

The rear module 24 includes an item deposit area 48 located at the trailing end of the telescoping take-away conveyor 26. The top surface 50 of the rear module 24 serves as a checked item storage surface. A bagging station 54 is located at the rear end of the rear module 24 adjacent to the item deposit area 48.

The operation and structure of the checkstand 20 are known in the art. A customer with a cart of items wheels the cart to the checkstand 20 and unloads the items onto the accumulation conveyor 30. The accumulation conveyor 30 moves the items toward the scanner 32. A register clerk standing in the register clerk side of the checkstand 20 lifts the items from the accumulation conveyor 30 and scans the items on the scanner 32. Alternatively, the price and stock number of the items may be manually entered by the register clerk on a keyboard (not shown). After scanning the items, the register clerk places the scanned items on the telescoping take-away conveyor 26. The items move along the telescoping take-away conveyor 26 to the item deposit area 48, where they are sorted along the top surface 50 of the rear module 24 by a baggage clerk, and bagged at the bagging station 54 by the bagging clerk.

The configuration of the checkstand 20 shown in FIG. 1 may be modified in manners well known to persons skilled in the checkstand art. For example, the accumulating conveyor 30 may be replaced with a rotating conveyor. Other configurations may be used. The present invention, however, has particular application for use with checkstands utilizing a telescoping take-away conveyor such as the telescoping take-away conveyor 26.

The telescoping take-away conveyor 26 may have several different configurations, but in accordance with one aspect of the present invention, is configured and operates much like the telescoping take-away conveyor described in U.S. Pat. Nos. 5,755,308 and 6,035,971, incorporated herein by reference. Briefly described, the telescoping take-away conveyor described in these patents is reconfigurable between the scan-and-pass, walk-through, and scan-and-bag positions. The telescoping take-away conveyor in one embodiment provides automatic retraction and extension of the telescoping take-away conveyor between the scan-and-pass, scan-and-bag, and walk-through positions. A friction roller in the telescoping take-away conveyor causes the telescoping take-away conveyor to have a tendency to either retract or expand, depending upon the direction of rotation of the conveyor belt for the telescoping take-away conveyor. A single button or switch changes the direction of rotation of the conveyor belt for the telescoping take-away conveyor, thus causing the telescoping take-away conveyor to extend or retract.

The telescoping take-away conveyor 26 may utilize a different configuration than the configuration described in the above patents, but preferably includes some sort of mechanism (e.g., a motor) to automatically extend and retract the telescoping take-away conveyor 26, because the present invention is directed to a mechanism, herein referred to as a "extension/retraction mechanism," that is configured to selectively stop and hold the telescoping take-away conveyor 26 at the scan-and-bag position as the telescoping take-away conveyor 26 is moving between the walk-through and scan-and-pass positions. The telescoping take-away conveyor in the above-referenced patents included a extension/retraction mechanism that utilized a solenoid, inter alia, to selectively stop and hold the telescoping take-away conveyor at the scan-and-bag position. The present invention, however, includes a different extension/retraction mechanism 60 (FIG. 3) for the telescoping take-away conveyor 26.

Figure 3:
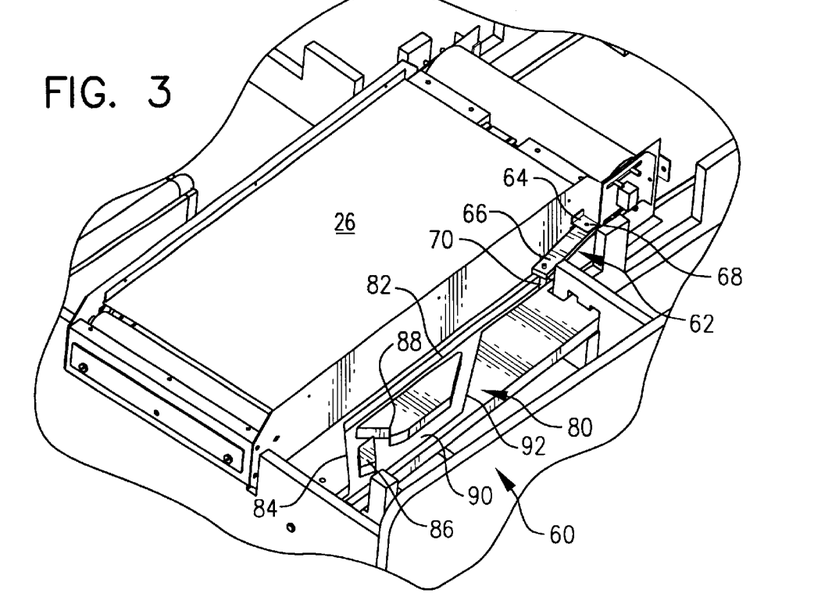
FIG. 3 is a partial cutaway, perspective view of the rear module of FIG. 2, showing details of the extension/retraction mechanism.

As can be seen in FIG. 3, the extension/retraction mechanism 60 includes a cam follower 62 that moves along with the telescoping take-away conveyor 26 and is pivotally attached to the telescoping take-away conveyor. Specifically, in the embodiment shown in FIG. 3, the cam follower 62 includes brackets 64, such as L-shaped brackets, attached to the side of the telescoping take-away conveyor 26. A horizontal bar 66 is rotatably attached to the brackets 64, for example by a pin 68. A rod 70 is attached the horizontal bar 66, for example by a fastener or by welding, and extends perpendicularly downward from the horizontal bar. The brackets 64, the horizontal bar 66, the pin 68, and the rod are preferably a metal such as steel, but other materials may be used.

The rod 70 is arranged so that it extends into a cam track 80. The cam track 80 may be formed, for example, of a series of grooves formed into a block of material, such as a low friction plastic, e.g., high density polyethylene. As described in detail below, the cam follower 62 (specifically, the rod 70) rides within the cam track 80 as the telescoping take-away conveyor 26 moves between the scan-and-bag, walk-through, and scan-and-pass positions. The cam track 80 includes a series of pathways and turn surfaces so that the cam follower may change course (e.g., along a different pathway or direction within the cam track) as the telescoping take-away conveyor moves along the cam track. The cam track 80 also includes at least one pocket for retaining the cam follower 62 when the telescoping take-away conveyor 26 is in the scan-and-bag position, as is described further below.

The cam track 80 shown in the drawings includes a first pathway 82 that extends parallel to the telescoping take-away conveyor 26. A first turn surface 84 is located at the end of the first pathway 82, and extends at approximately a 45 degree angle to the first pathway. A directional block 86 extends parallel to the first turn surface 84, and is located slightly rearward of the first turn surface. The directional block 86 ends at a tip, which is directed toward a pocket 88. The pocket 88 includes sides that slope inward toward its bottom.

A second pathway 90 extends parallel to the telescoping take-away conveyor 26, from beyond the end of the first turn surface 84 and along the outside of the directional block 86 and the pocket 88. The second pathway 90 includes a second turn surface 92 at its end, which extends at approximately a 45 degree angle to the second pathway. The second turn surface 92 ends in the first pathway 82.

Figure 4:
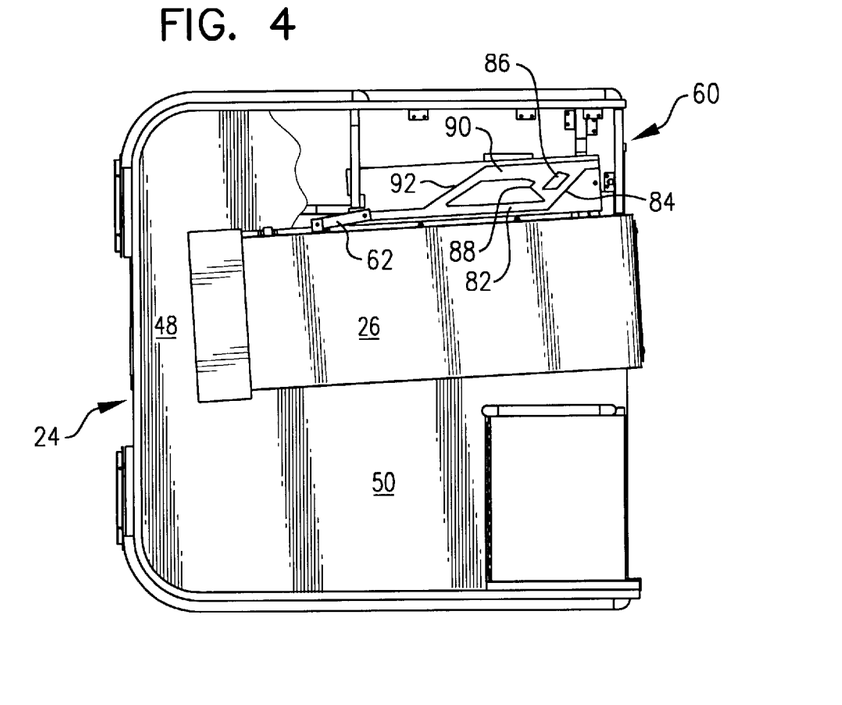
FIG. 4 is a partial cutaway, top view of the rear module of FIG. 3, showing a telescoping take-away conveyor fully retracted in the rear module.

The position of the cam follower 62 when the telescoping take-away conveyor 26 is in the fully retracted, walk-through position is shown in FIGS. 3 and 4. From this position, the telescoping take-away conveyor 26 may be advanced forward to the scan-and-pass or scan-and-bag positions.

If a register clerk desires to move the telescoping take-away conveyor 26 from the walk-through position to the scan-and-pass position, the register clerk operates the telescoping take-away conveyor 26 to make it extend. If the telescoping take-away conveyor 26 includes a friction roller, such as is used in the patents above, extending the telescoping take-away conveyor 26 requires only that the belt for the telescoping take-away conveyor be running in a clockwise, or backward direction. This movement causes the telescoping conveyor to extend unless the telescoping take-away conveyor is acted upon by an outside force (i.e., engages an obstacle). The function and operation of the extension mechanism are described in detail in the incorporated patents, and that detail will not be repeated here. However, to aid the reader, a short summary of the operation of the telescoping conveyor with a friction roller is provided.

Briefly described, the telescoping take-away conveyor of the incorporated patents includes a slide tray and a conveyor base. A serpentine belt wraps around a powered roller on the conveyor base, idler rollers on the conveyor base and slide tray, and a friction roller mounted on the slide tray. During normal operation of the telescoping take-away conveyor, the amount force needed to extend or retract the telescoping take-away conveyor is less than the force needed to overcome the friction in the friction roller. Thus, rotating the powered roller results in extension or retraction of the telescoping conveyor, as long as the extension or retraction does not encounter an impediment (e.g., an obstacle). When the friction roller does encounter an obstacle of sufficient force, the belt rotates the friction roller so that the belt may convey items along the telescoping take-away conveyor. In one embodiment described in the incorporated patents, the telescoping take-away conveyor is extended to the scan-and-pass position, and a scanner plate is hooked into a lip on the telescoping take-away conveyor to prevent retraction. The powered roller is then reversed, and the belt rotates in the proper direction (rotating the friction roller) so that items are conveyed from the scanner to the rear module.

Figure 5:
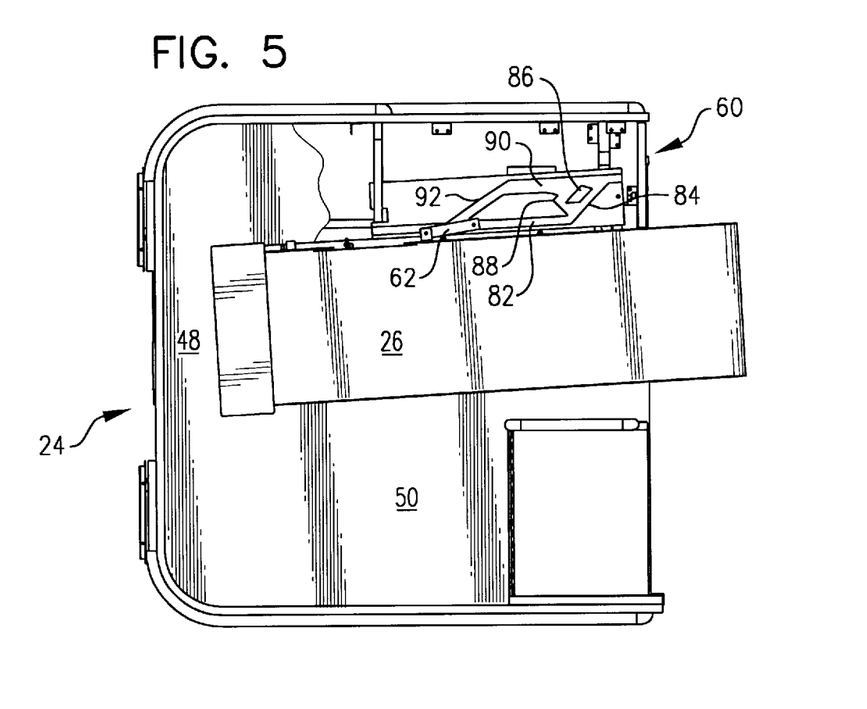
FIG. 5 is a partial cutaway, top view of the rear module of FIG. 3, similar to FIG. 4, showing the telescoping take-away conveyor partially extended.
Figure 6:
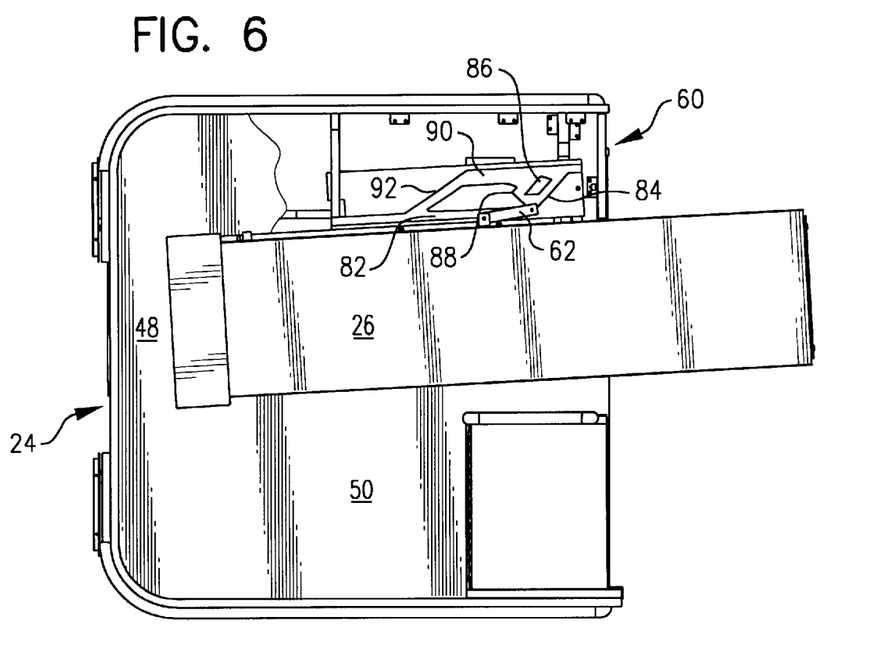
FIG. 6 is a partial cutaway, top view of the rear module of FIG. 3, similar to FIG. 5, showing the telescoping take-away conveyor further extended to just short of a scan-and-bag position for the telescoping take-away conveyor.

Returning to a description of the operation of the extension/retraction mechanism of the present invention, when the register clerk operates controls (e.g., a button or buttons and/or a switch) to extend the telescoping take-away conveyor 26, the cam follower 62 moves along the first pathway 82 from the position in FIGS. 3 and 4, through the position in FIG. 5, and toward the position in FIG. 6. The location where the second pathway 90 enters the first pathway may be slightly offset to assure that the cam follower 62 does not enter the second pathway 90 during this advancement of the telescoping take-away conveyor 26.

Figure 7:
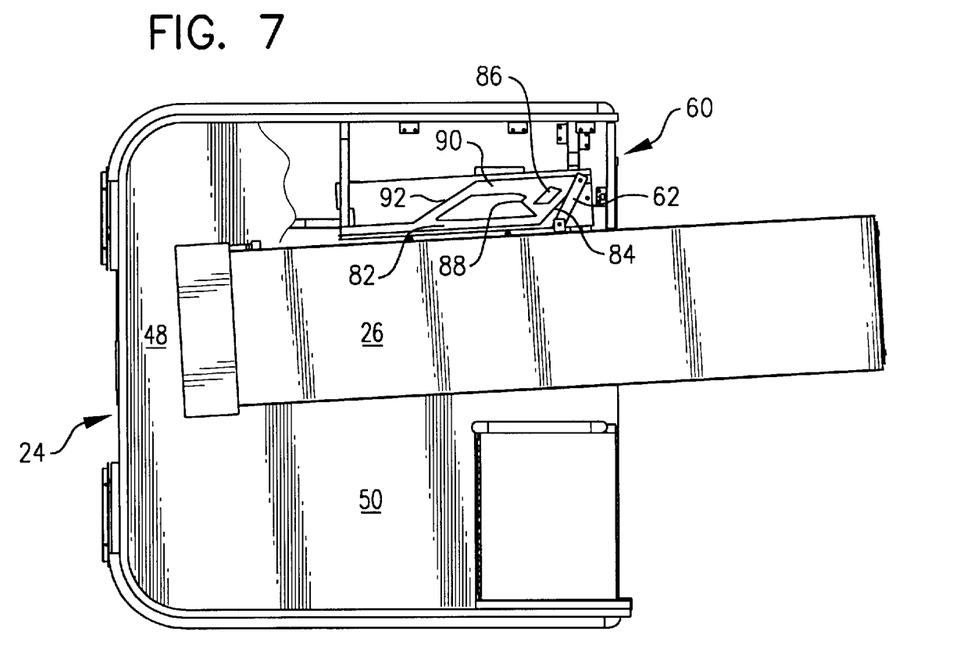
FIG. 7 is a partial cutaway, top view of the rear module of FIG. 3, similar to FIG. 6, showing the telescoping take-away conveyor further extended to just short of a scan-and-pass position for the telescoping take-away conveyor.

At the end of the first pathway 82, just prior to the telescoping take-away conveyor reaching a location adjacent to the scan-and-bag position, the cam follower 62 engages the first turn surface 84 (FIG. 6). The first turn surface 84 causes the cam follower 62 to turn off, or veer from, the first pathway 82. Assuming the telescoping take-away conveyor 26 does not encounter an obstacle, the telescoping take-away conveyor continues to extend beyond the position in FIG. 6, and the cam follower 62 runs along the first turn surface 84 (FIG. 10) until it reaches into the second pathway 90 (FIG. 7). The cam follower 62 may continue up the second pathway until the telescoping take-away conveyor 26 reaches the scan-and-pass position.

Figure 8:
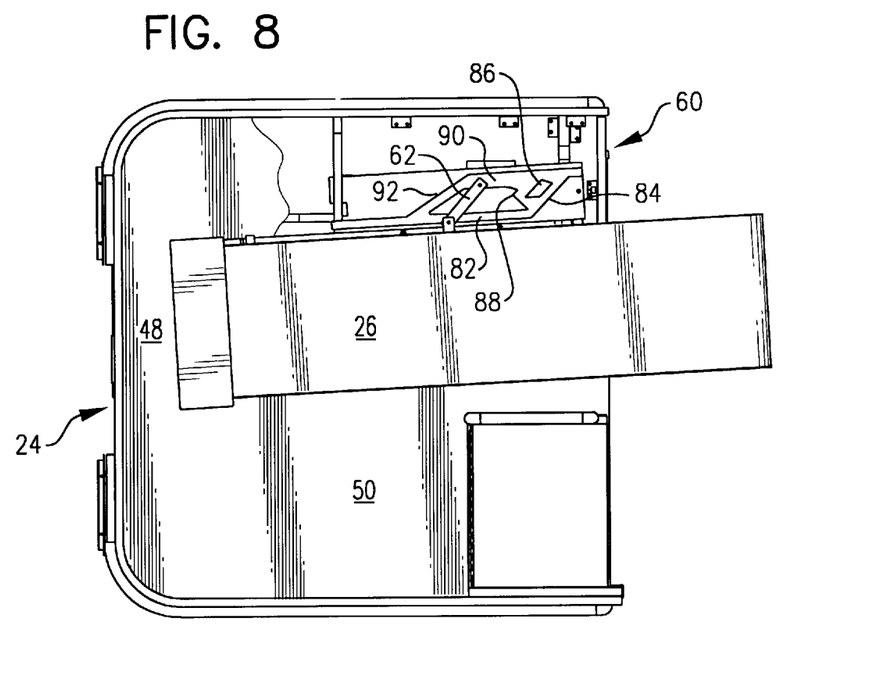
FIG. 8 is a partial cutaway, top view of the rear module of FIG. 3, similar to FIG. 7, showing the telescoping take-away conveyor partially retracted from the position shown in FIG. 7.
Figure 9:
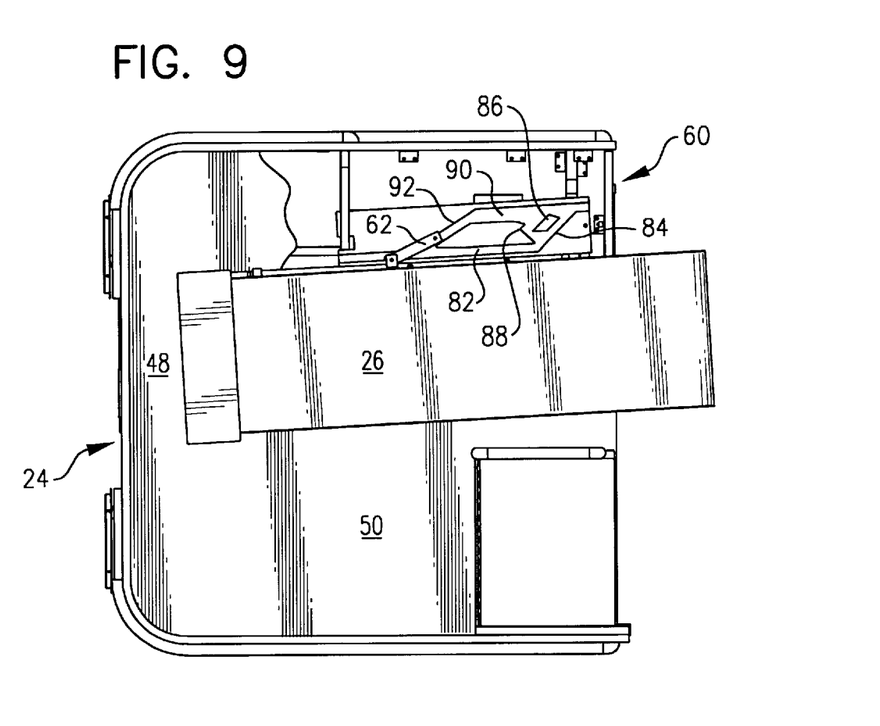
FIG. 9 is a partial cutaway, top view of the rear module of FIG. 3, similar to FIG. 8, showing the telescoping take-away conveyor further retracted from the position shown in FIG. 8.

To return to the walk-through position, the telescoping take-away conveyor 26 may be retracted, whereby the cam follower returns via the second pathway, from the position in FIG. 7 to the position in FIG. 8, until the cam follower engages the second turn surface 92, where the cam follower is driven toward the first pathway 82 (FIG. 9). The telescoping take-away conveyor 26 continues until the cam follower is in the first pathway 82, and then returns to the position in FIGS. 3 and 4.

Figure 10:
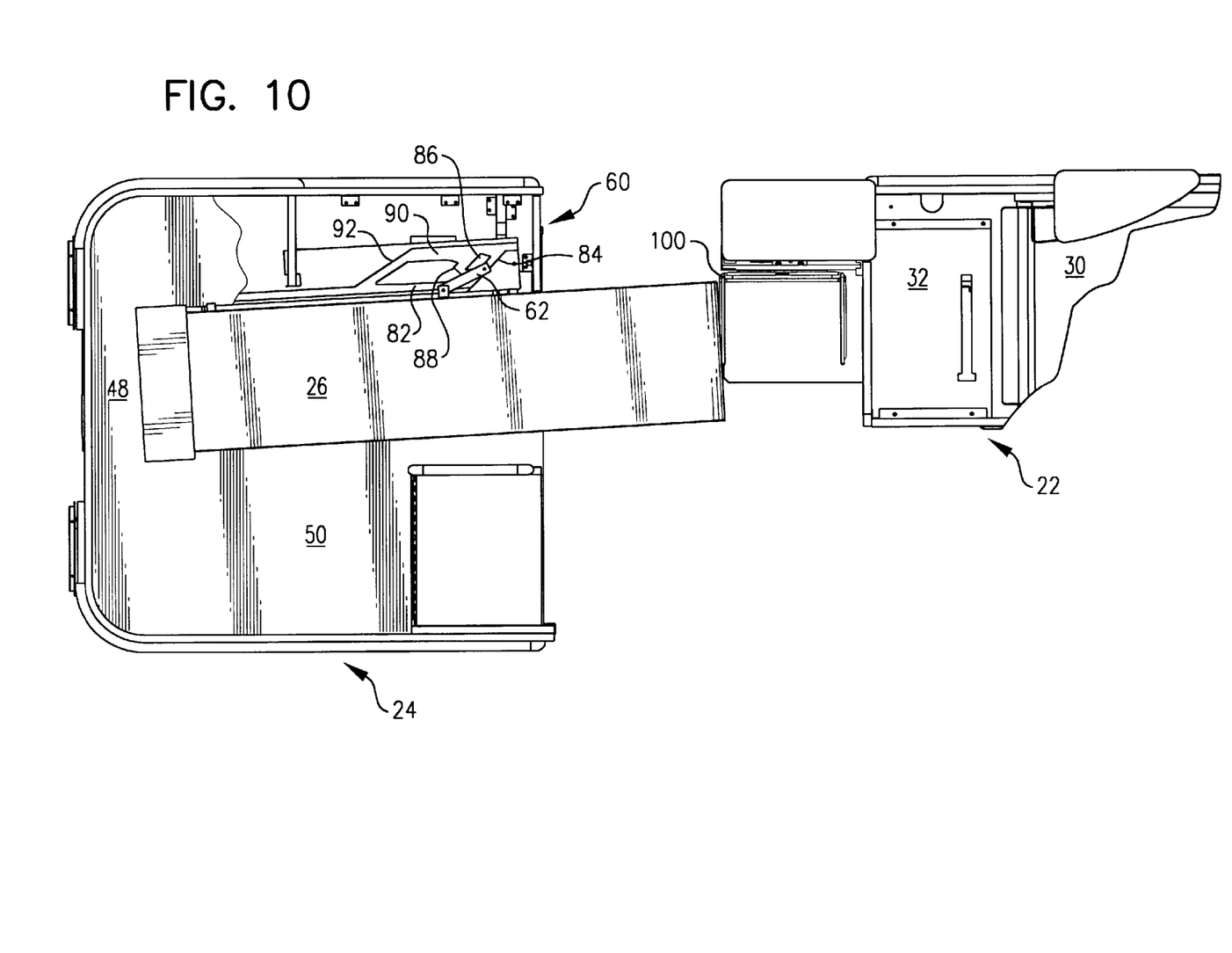
FIG. 10 is a partial cutaway, top view of the rear module and front module of FIG. 1, showing the telescoping take-away conveyor extended to contact a bag stand behind a scanner on the front module.
Figure 11:
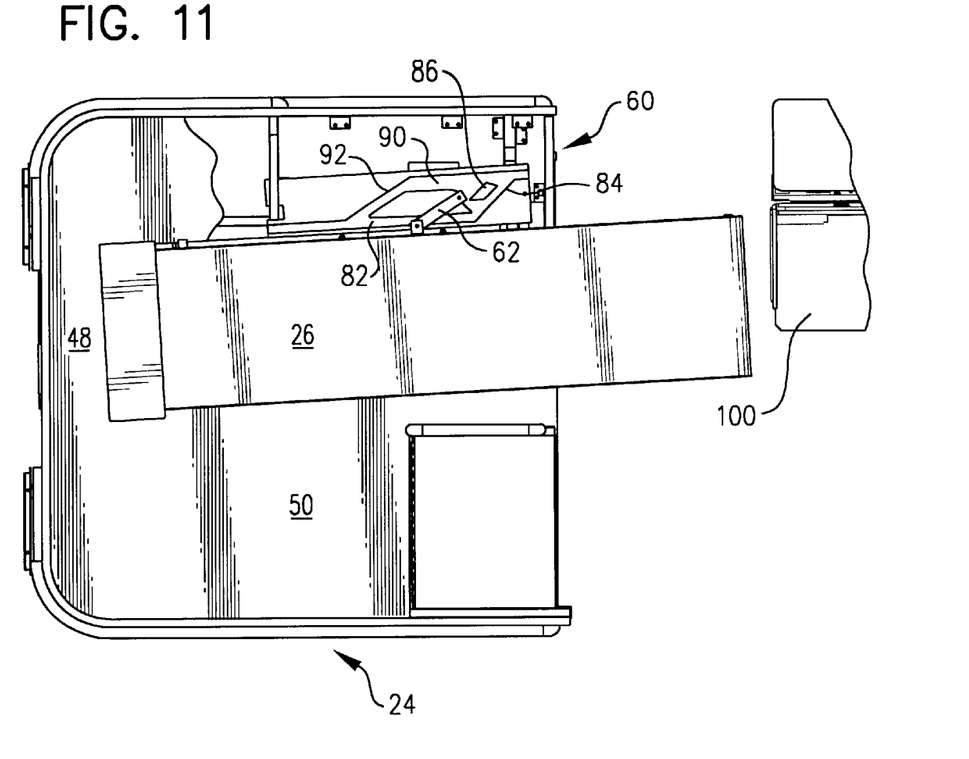
FIG. 11 is a partial cutaway, top view of the rear module and front module of FIG. 1, showing the telescoping take-away conveyor retracted from the position in FIG. 10 to a scan-and-bag position.

If the register clerk wants to move the telescoping take-away conveyor 26 to the intermediate, scan-and-bag position, the telescoping take-away conveyor is stopped while it advances along the first turn surface 84, such as at the position shown in FIG. 10. The telescoping take-away conveyor 26 may be stopped in a range of locations along the first turn surface 84, but to be properly positioned at the scan-and-bag position, the cam follower 62 should be aligned so that the directional block 86 or the inner wall of the pocket 88 will direct the cam follower into the pocket 88 upon reversing the direction of the telescoping take-away conveyor 26, as described further below.

To assure that the cam follower 62 stops in the proper location, an obstruction may be provided that may be selectively placed in the path of the telescoping take-away conveyor 26 to stop its movement. In accordance with one aspect of the present invention, a bag stand 100 (e.g., FIGS. 1 and 10) is provided that normally is mounted below the pathway for the telescoping take-away conveyor 26 (FIG. 1). The bag stand 100 may be moved upward to lock into a position where it is located in the path of the telescoping take-away conveyor 26 (FIG. 10). When moved into this position, the bag stand 100 acts as an obstacle that prevents further extension of the telescoping take-away conveyor 26. The location where the telescoping take-away conveyor 26 engages the bag stand 100 preferably is arranged so that the cam follower 62 is aligned so that it may move into the pocket 88 when the direction of the telescoping take-away conveyor 26 is reversed.

After the telescoping take-away conveyor 26 stops at a location where the cam follower 62 is properly aligned (e.g., by manually stopped extension of the telescoping take-away conveyor or by the telescoping take-away conveyor contacting the bag stand 100 as described above), the telescoping take-away conveyor is retracted. For the telescoping take-away conveyor in the incorporated patents, this means simply reversing the direction of the powered roller for the telescoping take-away conveyor. The pocket 88 is located rearward of the first turn surface 84, and receives the cam follower 62 as the telescoping take-away conveyor 26 is retracted. The directional block 86 and the sloped sides of the pocket 88 are arranged and configured to help direct the cam follower 62 into the pocket, and thus allow the cam follower to engage the pocket for a range of locations of the cam follower.

The engagement of the cam follower 62 with the bottom of the pocket 88 prevents further retraction of the telescoping take-away conveyor 26. Thus, the telescoping take-away conveyor 26 is held in the scan-and-bag position. For the telescoping take-away conveyor in the incorporated patents, the engagement of the cam follower with the pocket is sufficient to cause the telescoping take-away conveyor to start rotating the belt against the friction of the friction roller.

To remove the telescoping take-away conveyor 26 from the scan-and-bag position, the telescoping take-away conveyor is extended, causing the cam follower 62 to be removed from the pocket 88. For a telescoping take-away conveyor having a friction roller, this involves simply reversing the direction of the powered roller.

Figure 12:
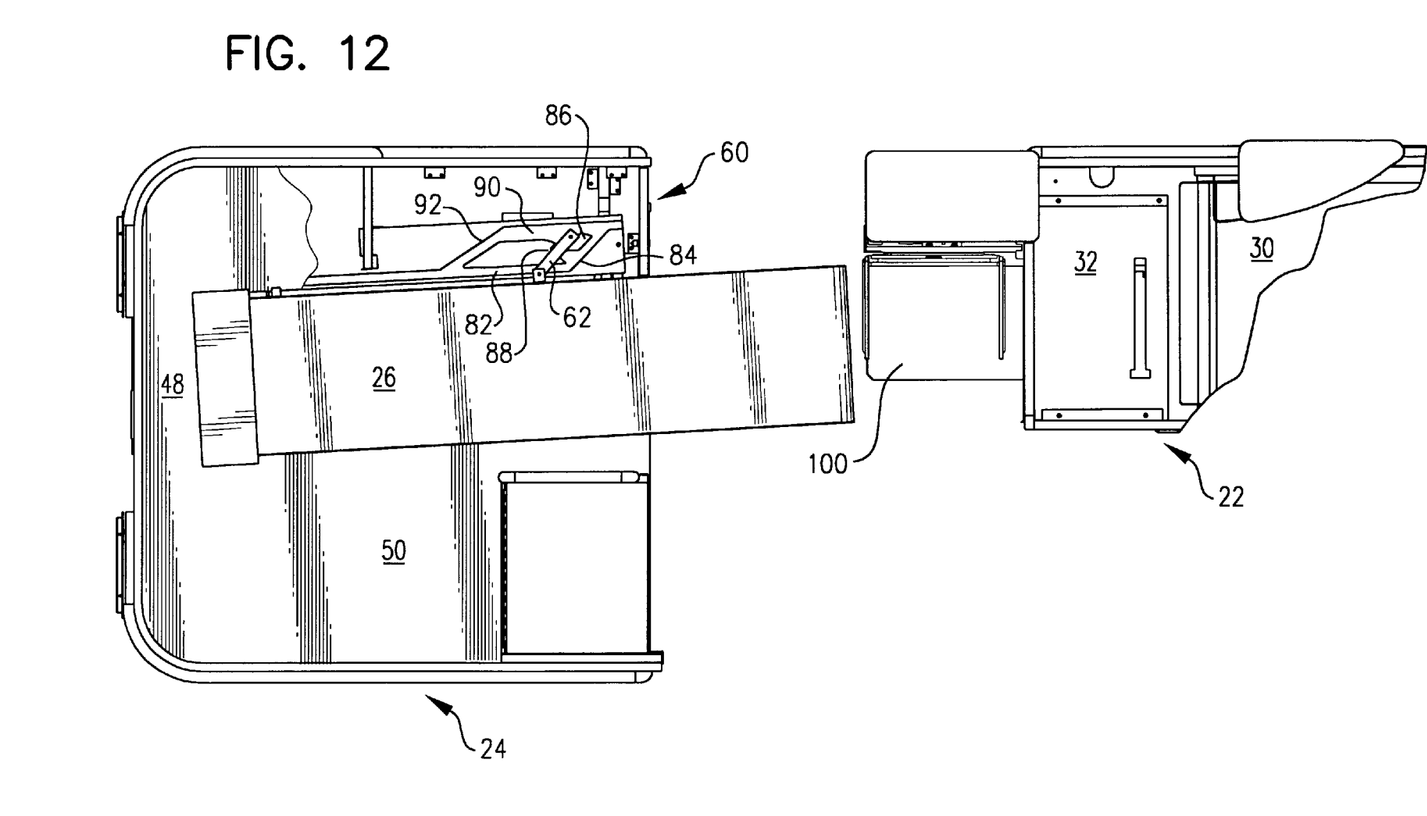
FIG. 12 is a partial cutaway, top view of the rear module and front module of FIG. 1, showing the telescoping take-away conveyor extended from the position of FIG. 11 to almost contact the bag stand behind the scanner on the front module.

When the telescoping take-away conveyor 26 is extended from the scan-and-bag position, the cam follower engages the directional block 86 (FIG. 12), which directs the cam follower into the second pathway 90. The telescoping take-away conveyor 26 may then move forward along the second pathway 90 to the scan-and-pass position, or the telescoping take-away conveyor may be retracted so that the cam follower returns along the second pathway to the walk-through position. Movement to the scan-and-pass position may be blocked by an item such as the bag stand 100. If so, the blocking item (e.g., the bag stand 100), the directional block 86, the second pathway 90, and the cam follower 62 are preferably arranged so that once the telescoping take-away conveyor 26 contacts the bag stand, the cam follower is located within the second pathway. In this manner, the telescoping take-away conveyor 26 may then be retracted to the walk-though position, returning the cam follower 62 to the position shown in FIGS. 3 and 4.

The extension/retraction mechanism of the present invention provides a means by which the telescoping take-away conveyor 26 may alternatively stop at the scan-and-bag or scan-and-pass locations without requiring a solenoid or other complicated or expensive parts. The extension/retraction mechanism further provides a mechanism whereby a telescoping take-away conveyor 26 may be retracted and extended between the walk-through, scan-and-pass, and scan-and-bag positions by using a single switch or button. For example, the telescoping take-away conveyor may include a friction roller or other friction device, such as described in the incorporated patents, whereby the direction of rotation of the belt for the telescoping take-away conveyor causes the belt to have a tendency to either retract or expand, depending upon the direction of rotation of the conveyor belt for the telescoping take-away conveyor. Using such a device, a clerk may move the telescoping take-away conveyor between the walk-through, scan-and-pass, and scan-and-bag positions by simply reversing the direction of rotation of the telescoping take-away conveyor in the proper locations.

The cam track 80 and cam follower combination shown is but one way to provide the extension/retraction mechanism of the present invention. A cam follower may, for example, be attached to the rear module 24, and the cam track may be attached to the telescoping take-away conveyor 26. The cam track may also take many other forms. For example, pathways and turn angles may be defined to cause the telescoping take-away conveyor 26 to normally stop at the scan-and-bag position, and to move to the scan-and-pass position after being stopped at the scan-and-bag position. In addition, different cam followers may be used, such as devices that are spring-biased to certain positions, or that roll along a surface. In essence, however, a extension/retraction mechanism in accordance with the present invention permits a telescoping take-away conveyor to move between the scan-and-pass, scan-and-bag, and walk-through positions, and selectively locks (e.g., prevents retraction of) the telescoping take-away conveyor at the intermediate, scan-and-bag position. The telescoping take-away conveyor 26 may be moved to each of these positions by simply extending and/or retracting the telescoping take-away conveyor. This type of mechanism has particular relevance to a telescoping take-away conveyor such as is described in the incorporated patents, wherein the stop at the scan-and-bag position may act as the force to overcome the friction in the friction roller. In this manner, a single switch may be used to retract or extend the telescoping take-away conveyor and position the conveyor in any of the scan-and-pass, scan-and-bag, and walk-through positions.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

What is claimed is:

1. A checkstand, comprising:
    a telescoping take-away conveyor mounted within the checkstand and comprising an extendible portion, the extendible portion being mounted such that the extendible portion is extendible from a first, retracted position to a second, extended position;
    a cam follower attached to one of the checkstand and the extendible portion; and
    a cam track attached to the other of the checkstand and the extendible portion;
    the cam follower and the cam track being configured such that, if the extendible portion is retracted a third position intermediate the first and second positions toward the first position, the cam follower engages the cam track and causes the extendible portion to stop at a first location, and if the extendible portion is retracted from the second position to the first position, the extendible portion is retractable to a second location that is beyond the first location.

2. The checkstand of claim 1, wherein the extendible portion is at least one of automatically retractable or extendible.

3. The checkstand of claim 1, wherein the second location comprises the first position.

4. The checkstand of claim 1, wherein the cam track comprises at least one pocket for retaining the cam follower when the extendible portion is in the first location.

5. The checkstand of claim 4, wherein the cam track comprises a first pathway along which the cam follower travels as the telescoping take-away conveyor is advanced forward from the first position.

6. The checkstand of claim 5, wherein the cam track comprises a first turn surface located on the first pathway, the first turn surface being located such that the first turn surface is engaged by the cam follower as the extendible portion is extended from the first position and the first turn surface being configured such that the first turn surface causes the cam follower to turn off the first pathway as the extendible portion is extended.

7. The checkstand of claim 6, wherein the pocket is located rearward from the first turn surface.

8. The checkstand of claim 7, further comprising a stop that may be selectively moved in the pathway of the extendible portion to cause the extendible portion to stop extension at the third position.

9. The checkstand of claim 8, wherein the stop comprises a bag stand.

10. The checkstand of claim 9, wherein the bag stand is reconfigurable to a position where it is located below a pathway of the extendible portion to a position where it is located in the pathway of the extendible portion and acts as the stop.

11. The checkstand of claim 6, further comprising a second turn surface and a second pathway, wherein when the extendible portion is extended from the first location, the cam follower is removed from the pocket and engages the second turn surface, which directs the cam follower to the second pathway, and wherein further extension of the extendible portion causes the extendible portion to move to the second position.

12. The checkstand of claim 11, wherein retraction of the extendible portion when the cam follower is in the second pathway causes the extendible portion to return to the first position.

13. The checkstand of claim 11, wherein extending the extendible portion with the cam follower moving along the first turn surface without stopping at the third position causes the extendible portion to move to the second position.

14. The checkstand of claim 13, wherein retraction of the extendible portion when the cam follower is in the second pathway causes the extendible portion to return to the first position.

15. The checkstand of claim 6, wherein the telescoping take-away conveyor further comprises a belt and means for causing rotation of a the belt in one direction to cause the extendible portion to extend unless the extendible portion is acted upon by a force, and rotating the belt in an opposite direction causes the belt to retract unless acted on by a force.

16. The checkstand of claim 15, wherein the mechanism comprises a friction roller.

17. The checkstand of claim 15, wherein the pocket retaining the cam follower is sufficient to be the force.

18. The checkstand of claim 1, further comprising a stop that may be selectively moved in the pathway of the extendible portion to cause the extendible portion to stop extension at the third position.

19. The checkstand of claim 18, wherein the stop comprises a bag stand.

20. The checkstand of claim 19, wherein the bag stand is reconfigurable to a position where it is located below a pathway of the extendible portion to a position where it is located in the pathway of the extendible portion and acts as the stop.

21. The checkstand of claim 1, wherein the telescoping take-away conveyor further comprises a belt and means for causing rotation of a the belt in one direction to cause the extendible portion to extend unless the extendible portion is acted upon by a force, and rotating the belt in an opposite direction cause the belt to retract unless acted on by a force.

22. The checkstand of claim 21, wherein the mechanism comprises a friction roller.

23. The checkstand of claim 22, wherein the cam track comprises at least one pocket for retaining the cam follower when the telescoping take-away conveyor is in the first location.

24. The checkstand of claim 23, wherein the pocket retaining the cam follower is sufficient to be the force.

* * * * *